US009920709B2

(12) United States Patent
Frank et al.

(10) Patent No.: US 9,920,709 B2
(45) Date of Patent: Mar. 20, 2018

(54) DIELECTRIC ELASTOMER DEVICE TO FILL STEPS OR GAPS IN A THRUST REVERSER

(71) Applicant: Rohr, Inc., Chula Vista, CA (US)

(72) Inventors: Joel H. Frank, La Jolla, CA (US); Lubomir A. Ribarov, West Hartford, CT (US)

(73) Assignee: Rohr, Inc., Chula Vista, CA (US)

( * ) Notice: Subject to any disclaimer, the term of this patent is extended or adjusted under 35 U.S.C. 154(b) by 319 days.

(21) Appl. No.: 14/626,547

(22) Filed: Feb. 19, 2015

(65) Prior Publication Data
US 2016/0245231 A1 Aug. 25, 2016

(51) Int. Cl.
| | |
|---|---|
| F02K 1/72 | (2006.01) |
| F02K 1/68 | (2006.01) |
| F02K 1/70 | (2006.01) |
| F02K 1/66 | (2006.01) |
| F02K 1/74 | (2006.01) |
| F02K 1/64 | (2006.01) |
| F02K 1/76 | (2006.01) |

(52) U.S. Cl.
CPC .......... *F02K 1/72* (2013.01); *F02K 1/64* (2013.01); *F02K 1/66* (2013.01); *F02K 1/68* (2013.01); *F02K 1/70* (2013.01); *F02K 1/74* (2013.01); *F02K 1/76* (2013.01); *F05D 2250/90* (2013.01); *Y02T 50/672* (2013.01)

(58) Field of Classification Search
CPC ..... F02K 1/70; F02K 1/72; F02K 1/64; F02K 1/645; F02K 1/66; F02K 1/68; F02K 1/566; F02K 1/74; F02K 1/76; F02K 1/805
See application file for complete search history.

(56) References Cited

U.S. PATENT DOCUMENTS

| | | | |
|---|---|---|---|
| 5,003,770 A | * | 4/1991 | Schegerin ................ F02K 1/70 239/265.29 |
| 5,239,822 A | | 8/1993 | Buchacher |
| 5,671,598 A | | 9/1997 | Standish |
| 6,068,213 A | | 5/2000 | Gonidec et al. |

(Continued)

FOREIGN PATENT DOCUMENTS

| | | |
|---|---|---|
| EP | 0357494 | 8/1989 |
| EP | 0520871 | 6/1992 |

(Continued)

OTHER PUBLICATIONS

Wikipedia, Dielectric Elastomer, Apr. 13, 2008, pp. 1-2, (https://web.archive.org/web/20080413231456/http://en.wikipedia.org/wiki/Dielectric_elastomers).*

(Continued)

*Primary Examiner* — Pascal M Bui Pho
*Assistant Examiner* — Thuyhang Nguyen
(74) *Attorney, Agent, or Firm* — O'Shea Getz P.C.

(57) ABSTRACT

Aspects of the disclosure are directed to a thrust reverser of an aircraft, comprising: a wall having a first surface that partially forms a flow channel associated with an air flow, a blocker door having a second surface that partially forms the flow channel, and a dielectric elastomeric device that is configured to selectively expand and contract within a cavity formed between the wall and the blocker door where the cavity is substantially radially adjacent to the flow channel when the thrust reverser is in a stowed state.

14 Claims, 10 Drawing Sheets

(56) References Cited

U.S. PATENT DOCUMENTS

| | | | |
|---|---|---|---|
| 6,293,495 B1 | 9/2001 | Aten | |
| 6,995,658 B2 * | 2/2006 | Tustison | H04B 3/548 340/12.38 |
| 8,316,632 B2 | 11/2012 | West | |
| 8,593,035 B2 | 11/2013 | Asada | |
| 2008/0061192 A1 * | 3/2008 | Sullivan | B64C 21/10 244/200 |
| 2010/0329851 A1 * | 12/2010 | Nilsson | F01D 5/148 415/151 |
| 2014/0116025 A1 | 5/2014 | Todorovic | |

FOREIGN PATENT DOCUMENTS

| | | |
|---|---|---|
| EP | 0542624 | 11/1992 |
| EP | 0558381 | 2/1993 |
| EP | 0601610 | 11/1993 |
| EP | 0852290 | 12/1996 |
| EP | 0926333 | 12/1997 |
| EP | 0882881 | 6/1998 |
| EP | 0763653 | 9/2005 |
| WO | 9855754 | 12/1998 |

OTHER PUBLICATIONS

Wikipedia, Composite Material, Sep. 28, 2013, pp. 1-4, (https://web.archive.org/web/20130928224642/http://en.wikipedia.org/wiki/Composite_material).*

\* cited by examiner

DIELECTRIC ELASTOMER DEVICE TO FILL STEPS OR GAPS IN A THRUST REVERSER

BACKGROUND

Figure 1A:
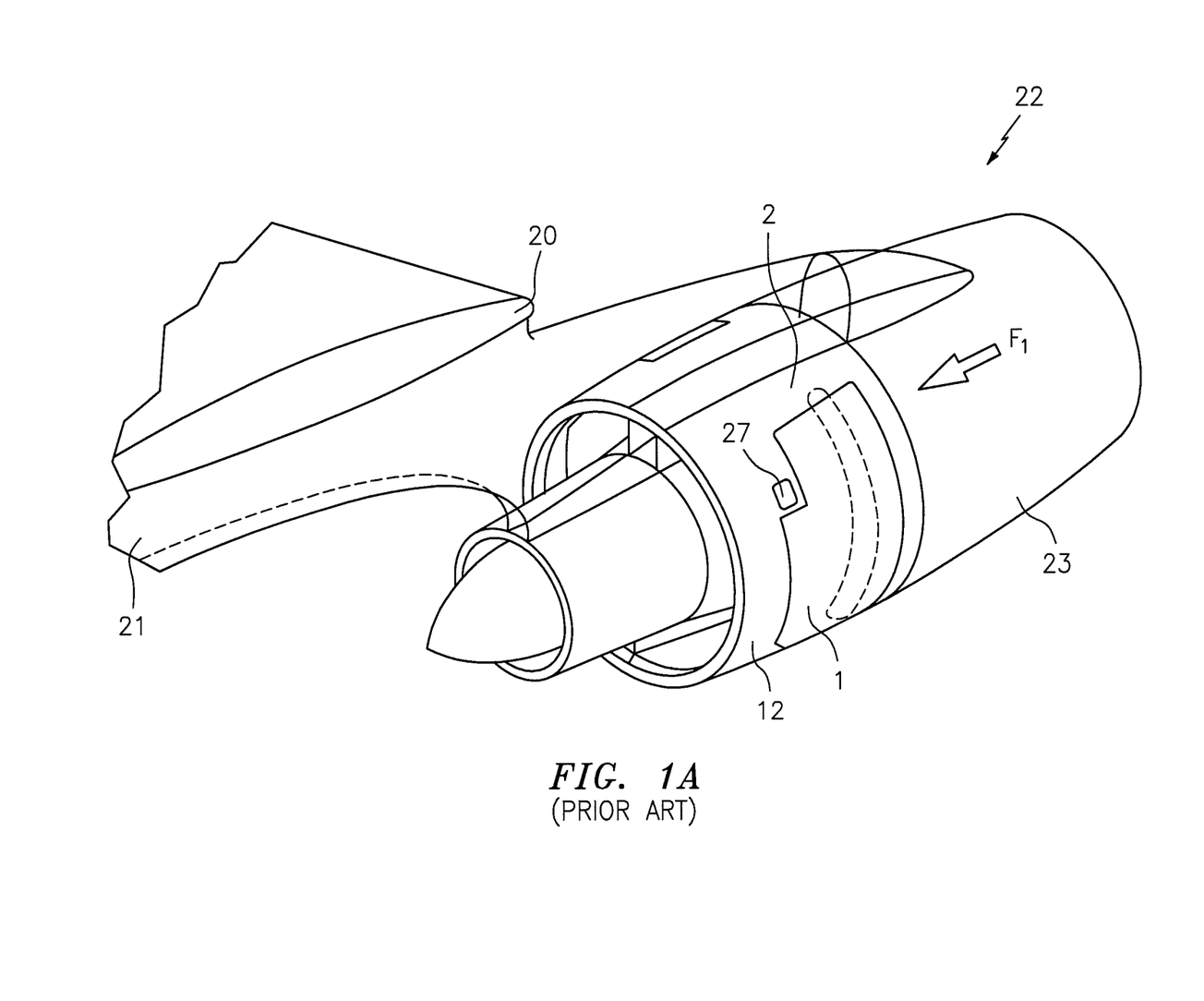
FIGS. 1A-1C illustrate components and devices associated with an aircraft nacelle thrust reverser in accordance with the prior art.
Figure 1B:
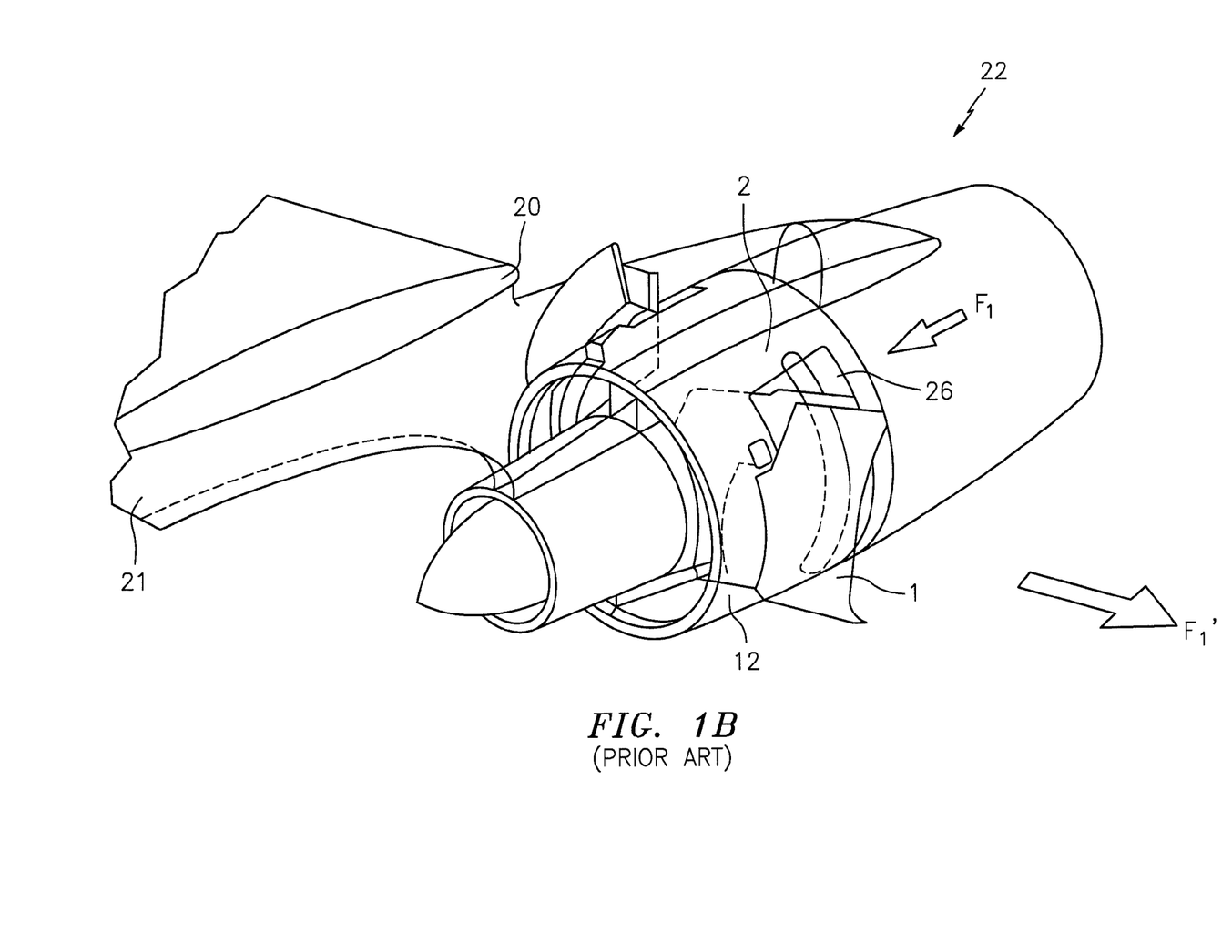

On an aircraft, a nacelle is used to house an engine and a thrust reverser which can be of the cascade or pivoting type, among other types. FIGS. 1A-1B illustrate a typical gas turbine engine inside a nacelle 22, which is attached via a pylon 21 to an aircraft wing 20. The nacelle 22 includes a forward fixed structure 23 and an aft fixed structure 12. The aft fixed structure 12 includes a thrust reverser.

A main jet stream $F_1$ flows through the nacelle 22 from an approximate right-to-left direction in FIGS. 1A-1B. Whereas FIG. 1A shows the thrust reverser operating in a stowed state/mode, FIG. 1B illustrates the thruster reverser operating in a deployed state/mode with a radially outward deflected jet $F_1'$ exiting doors 1 which pivot on two pivot bearings 27 (FIG. 1A), provided in lateral side beams 2 (FIG. 1A) which bound an opening 26 (FIG. 1B).

Figure 1C:
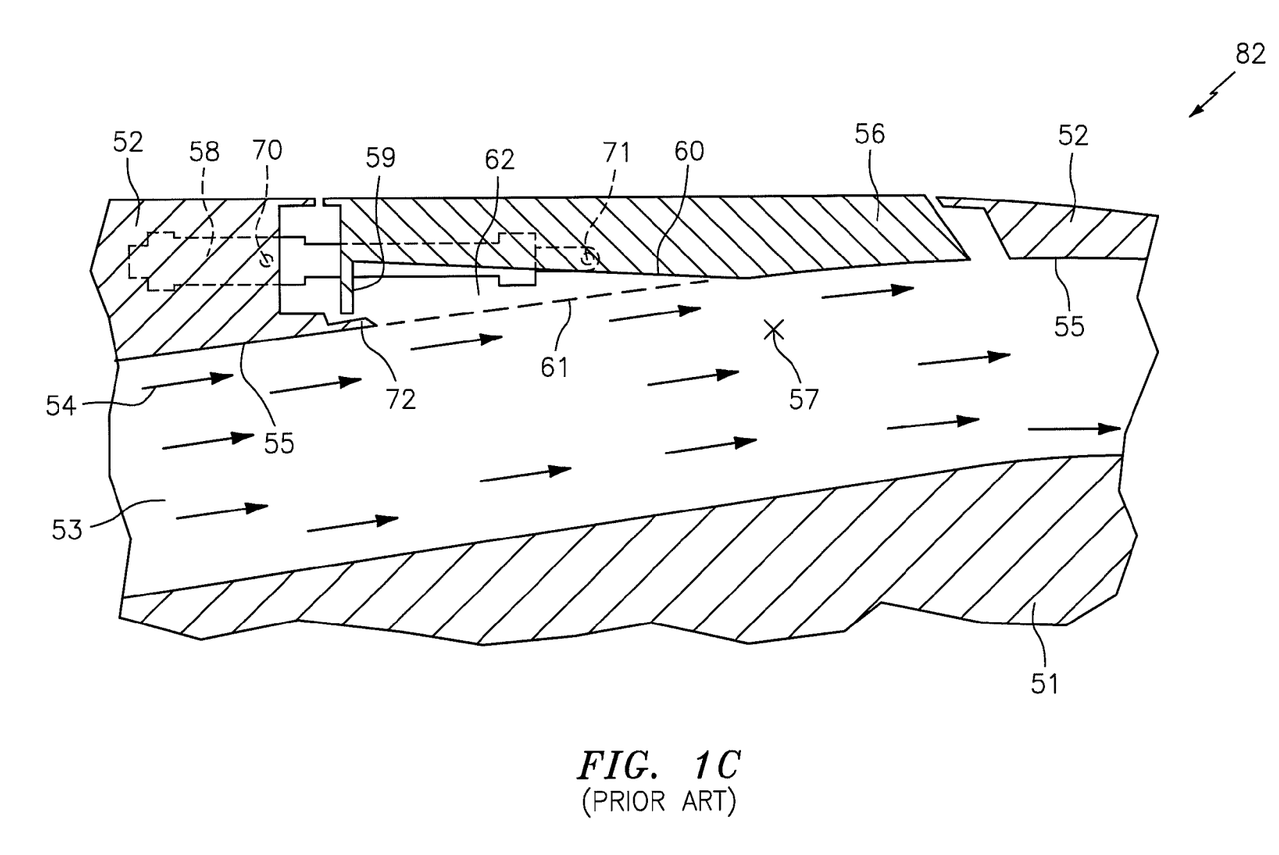

FIG. 1C provides additional details regarding a portion of a thrust reverser 82 (which may be incorporated in the nacelle 22 of FIGS. 1A-1B). As shown in FIG. 1C (which is representative of a thrust reverser operating in a stowed state/mode), a flow channel 53 is formed between a first wall (e.g., an inner wall) 51 and a second wall (e.g., an outer wall) 52. Arrows 54 represent a flow of air in the flow channel 53; the air flow 54 is generally in a left-to-right direction in FIG. 1C and may correspond to the main jet stream $F_1$ of FIGS. 1A-1B. The wall 52 has associated therewith an inner surface 55 that is proximate/adjacent to the flow channel 53. The thrust reverser 82 includes a blocker door 56 (which may correspond to the doors 1 of FIGS. 1A-1B). An axis of rotation for the blocker door 56 is shown as reference character 57. An actuator 58 is used to control/drive the deploying or stowing of the blocker door 56. The blocker door 56 includes a front deflector 59 and an inner surface 60. The components/devices that have been described form a flow line 61 of the channel 53 and also form a flow cavity 62. Superimposed in FIG. 1C are reference characters 70, 71, and 72; reference character 70 is representative of an articulation point for the actuator 58, reference character 71 is representative of a fixed connection/coupling between the actuator 58 and the blocker door 56, and reference character 72 is representative of a resting lip for the front deflector 59.

The contour/shape of the flow channel 53 has a significant impact on operational parameters. For example, it is generally desirable to have a smooth flow line 61. However, the cavity 62 has been shown to contribute to total pressure losses, due at least in part to secondary flows recirculating behind the blocker door 56. The pressure losses lead to degraded performance in terms of, e.g., specific fuel consumption (SFC).

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a thrust reverser of an aircraft, comprising: a wall having a first surface that partially forms a flow channel associated with an air flow, a blocker door having a second surface that partially forms the flow channel, and a dielectric elastomeric (DE) device that is configured to selectively expand and contract within a cavity formed between the wall and the blocker door where the cavity is substantially radially adjacent to the flow channel when the thrust reverser is in a stowed state. In some embodiments, the dielectric elastomeric device is in a first state when the thruster reverser is operated in the stowed state and in a second state when the thrust reverser is operated in a deployed state. In some embodiments, a first size of the dielectric elastomeric device in the first state is larger than a second size of the dielectric elastomeric device in the second state. In some embodiments, the dielectric elastomeric device comprises an elastomer located between two electrodes. In some embodiments, the dielectric elastomeric device is in an energized state when the thruster reverser is operated in the stowed state and in a de-energized state when the thrust reverser is operated in a deployed state. In some embodiments, the energized state and the de-energized state are based on a voltage that is applied to the electrodes. In some embodiments, the voltage is based on a 28 Volt direct current aircraft power source. In some embodiments, the thrust reverser further comprises a shutter plate coupled to the dielectric elastomeric device, wherein the shutter plate partially forms the flow channel. In some embodiments, the shutter plate is formed from at least one of aluminum, titanium, or a composite material. In some embodiments, a first end of the shutter plate is hinged to the blocker door, and wherein a second end of the shutter plate couples to a protrusion formed in a deflector when the thrust reverser is operated in the stowed state. In some embodiments, the dielectric elastomeric device is configured to completely fill the cavity when the thrust reverser is operated in the stowed state. In some embodiments, the thrust reverser system further comprises an actuator configured to control a deployment or stowing of the blocker door. In some embodiments, the dielectric elastomeric device is wedge-shaped.

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Figure 6:
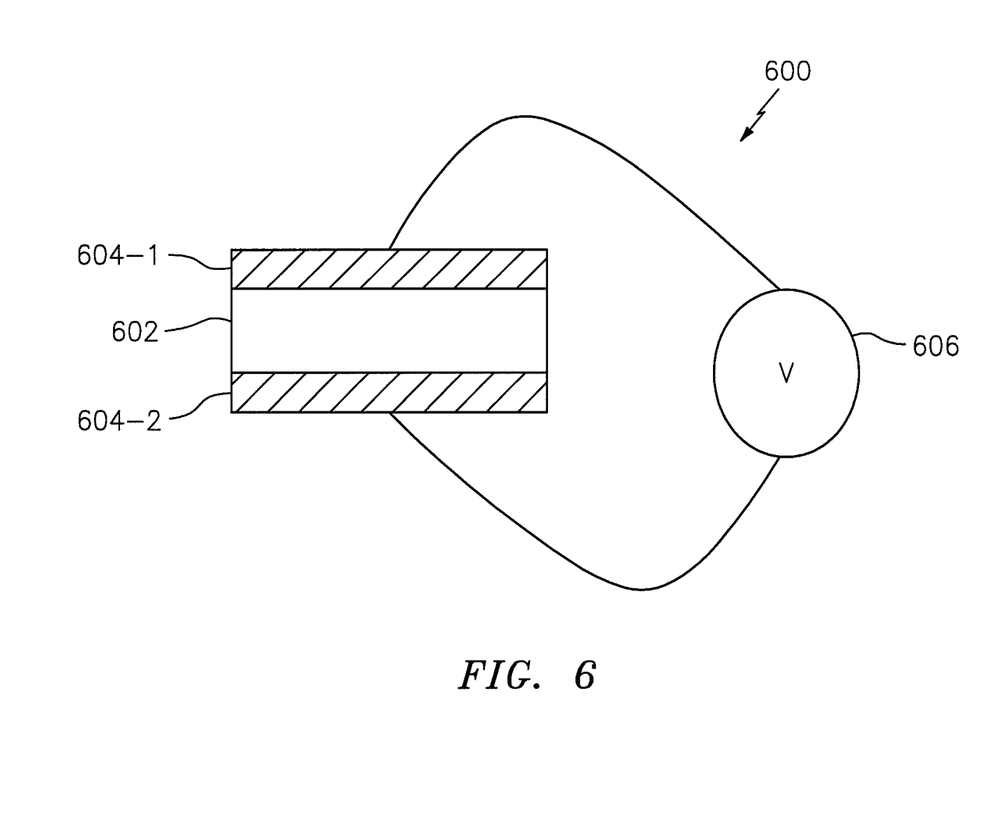
FIG. 6 illustrates a DE device in accordance with aspects of this disclosure.

In accordance with various aspects of the disclosure, apparatuses, systems and methods are described for utilizing a dielectric elastomeric device in connection with a thrust reverser. As one skilled in the art would appreciate, a DE device may belong to a family of electroactive polymers which are capable of large strains (e.g., on the order of 100% to 300%) that are produced in response to one or more inputs or conditions, such as for example an electric current, an electric field, etc. Referring to FIG. 6, a DE-based actuator 600 may use an elastomer (e.g., a plastic film) 602 located between two electrodes 604-1 and 604-2. Upon application of a voltage (V) 606 across the electrodes 604-1 and 604-2, the elastomer 602 is deformed due to electrostatic pressure resulting from the Coulomb forces between the electrodes 604-1 and 604-2.

The DE device may be used to increase/maximize forward mode (stowed reverser) thrust reverser performance by reducing/minimizing total pressure losses. The DE device may be used to control a selective filling of a pit/cavity (e.g., cavity 62 of FIG. 1C) of a thrust reverser.

Figure 2A:
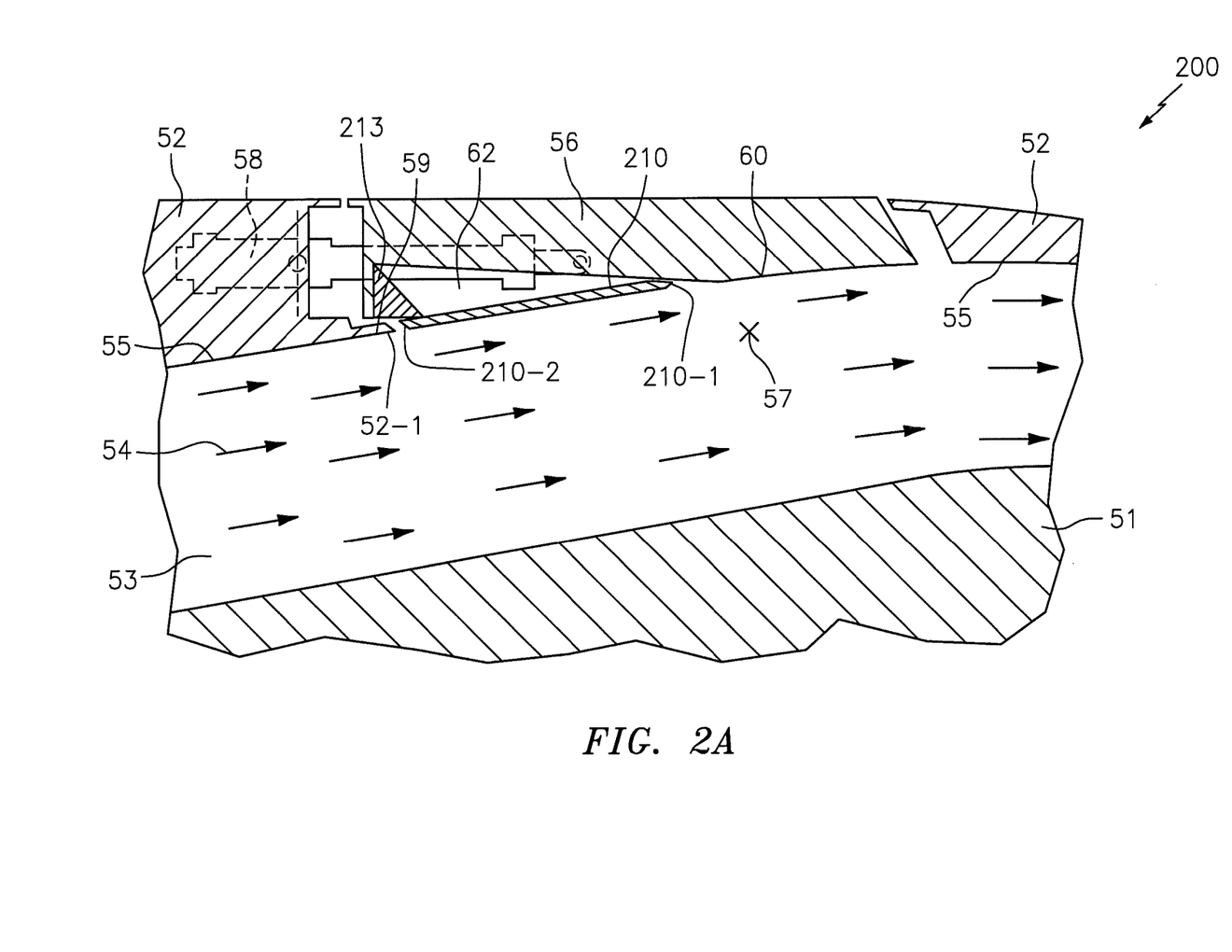
FIG. 2A illustrates a thrust reverser incorporating a shutter plate and a dielectric elastomeric (DE) device when a pivot-door-type thrust reverser is in a stowed state.

FIG. 2A illustrates a thrust reverser 200 operating in a stowed state. The thrust reverser 200 includes many of the components and devices described above in connection with FIG. 1C, and so, a complete re-description of those components and devices is omitted for the sake of brevity.

The thrust reverser 200 includes a shutter plate 210 (having an axis of rotation denoted by a reference character 210-1) and a DE device 213. The shutter plate 210 is coupled (e.g., attached or hinged) to the blocker door 56 at the first end 210-1 of the shutter plate 210. A second end 210-2 of the shutter plate 210 may couple to, or rest on, a protrusion/lip 52-1 formed in the wall 52 or the front deflector 59. The shutter plate 210 may be formed from one or more materials, such as aluminum, titanium, or a composite material.

In FIG. 2A, the DE device 213 is shown in a first state (e.g., an energized state). In this first state, the DE device 213 may act as a locking mechanism with respect to the shutter plate 210, preventing the shutter plate 210 from rotating due to air flow buffeting in either reverse mode or forward mode about the end 210-1 in a clockwise direction in FIG. 2A.

Figure 2B:
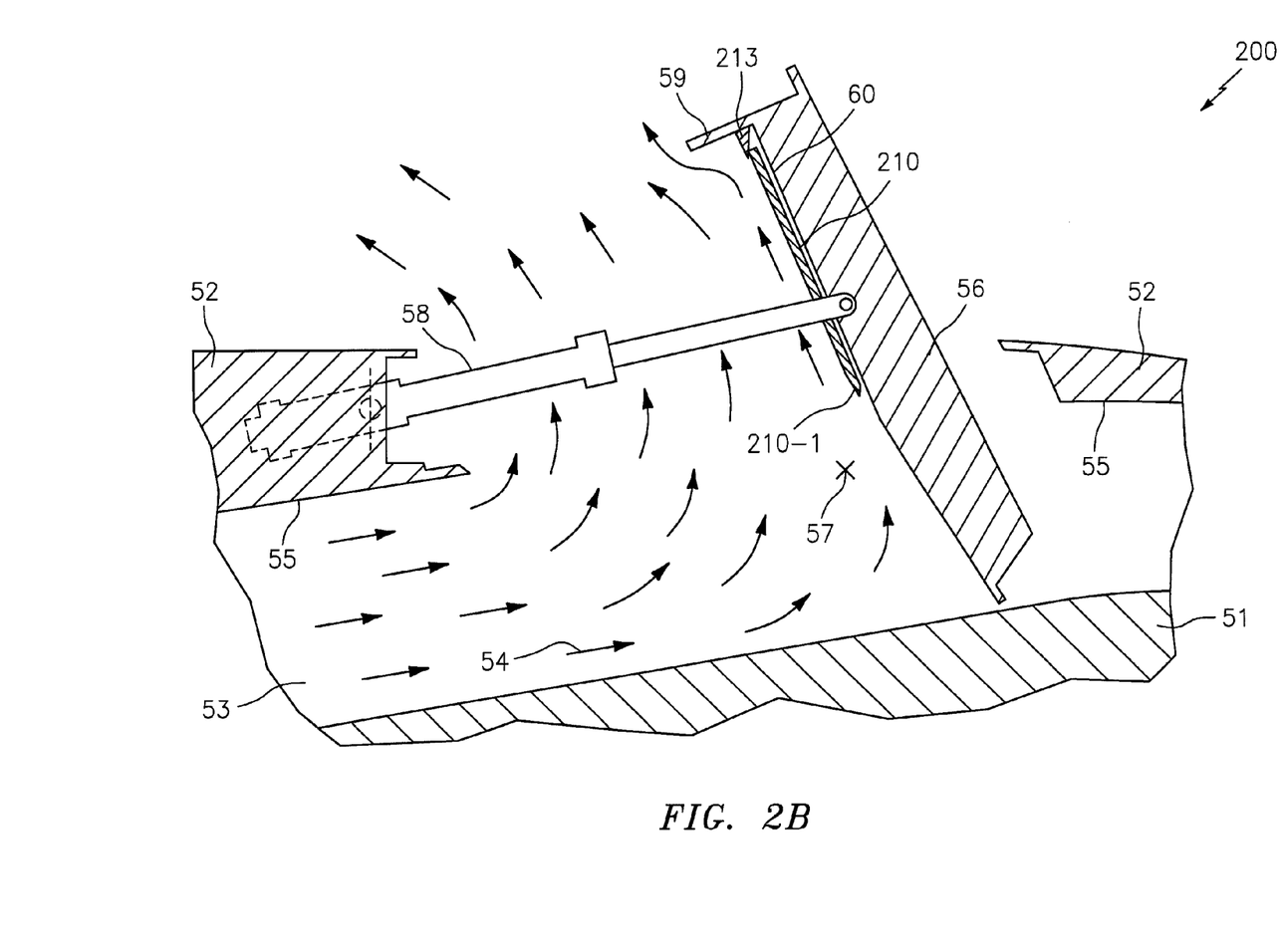
FIG. 2B illustrates the thrust reverser of FIG. 2A when the pivot-door-type thrust reverser is in a deployed state.

FIG. 2B illustrates the thrust reverser 200 operating in a deployed state. In FIG. 2B, the DE device 213 is shown in a second state (e.g., a de-energized state). The smaller size/profile of the DE device 213 in the second state (relative to the first state of the DE device 213 shown in FIG. 2A) may allow/enable the shutter plate 210 to be forced open or rotate in a clockwise direction about the end 210-1.

Figure 3A:
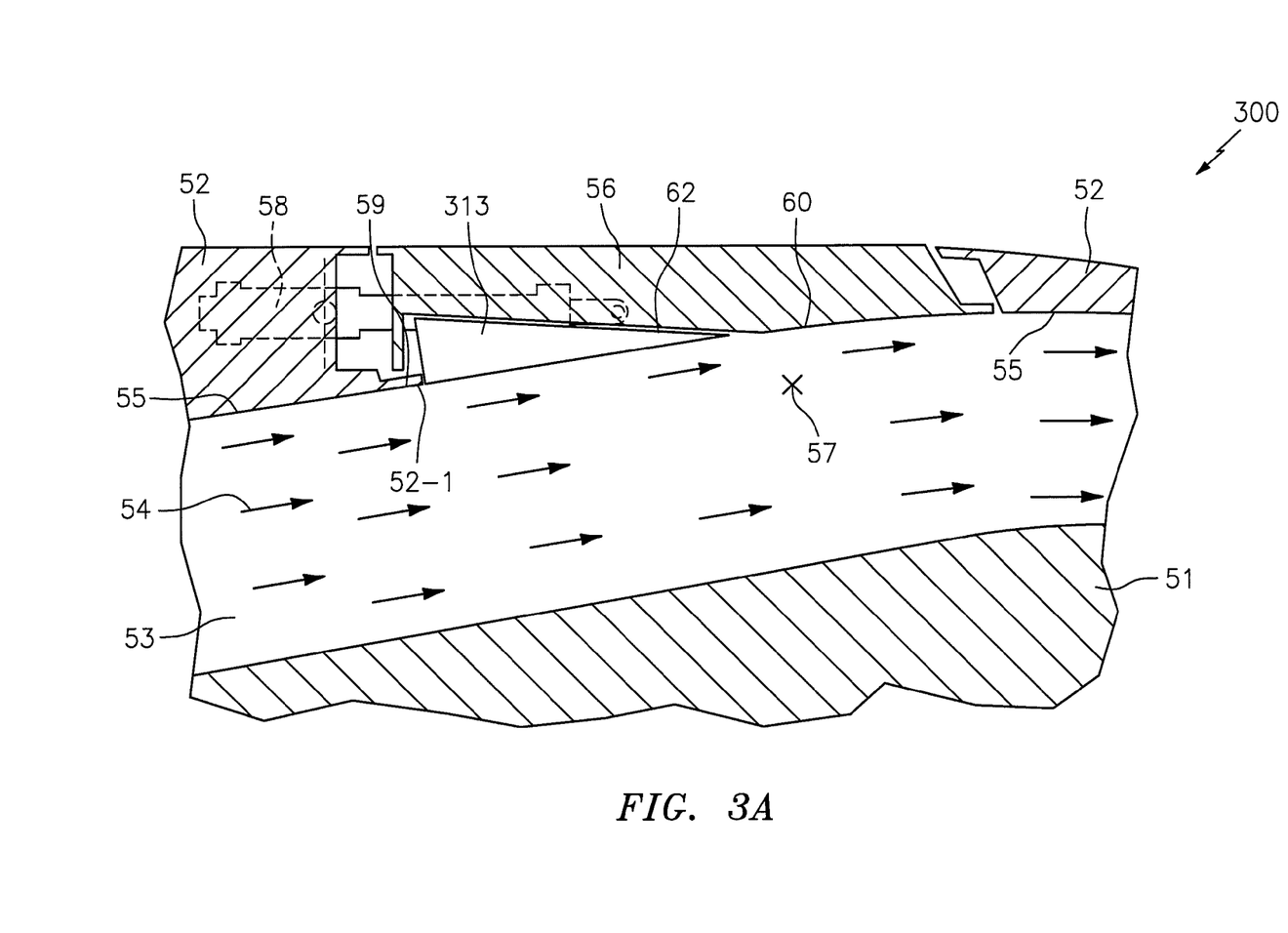
FIG. 3A illustrates a thrust reverser incorporating a DE device that fills a cavity when a pivot-door-type thrust reverser is in a stowed state.

FIG. 3A illustrates a thrust reverser 300 operating in a stowed state. The (components/devices and operation of the) thrust reverser 300 may be similar to the thrust reverser 200 described above, and so, a complete re-description is omitted for the sake of brevity. Differences between the thrust reverser 300, relative to the thrust reverser 200, are described below.

Whereas in FIG. 2A the DE device 213 is shown as consuming/filling a portion of the cavity 62, in FIG. 3A a DE device 313 fills an entirety of the cavity 62 when the DE device 313 is operated in a first state (e.g., an energized state). In FIG. 3A, the DE device 313 may be aligned with the inner surface 55 of the wall 52 and with the inner surface 60 of the blocker door 56, providing for an overall surface for the flow channel 53 that is substantially smooth/continuous and substantially free of steps/discontinuities.

Figure 3B:
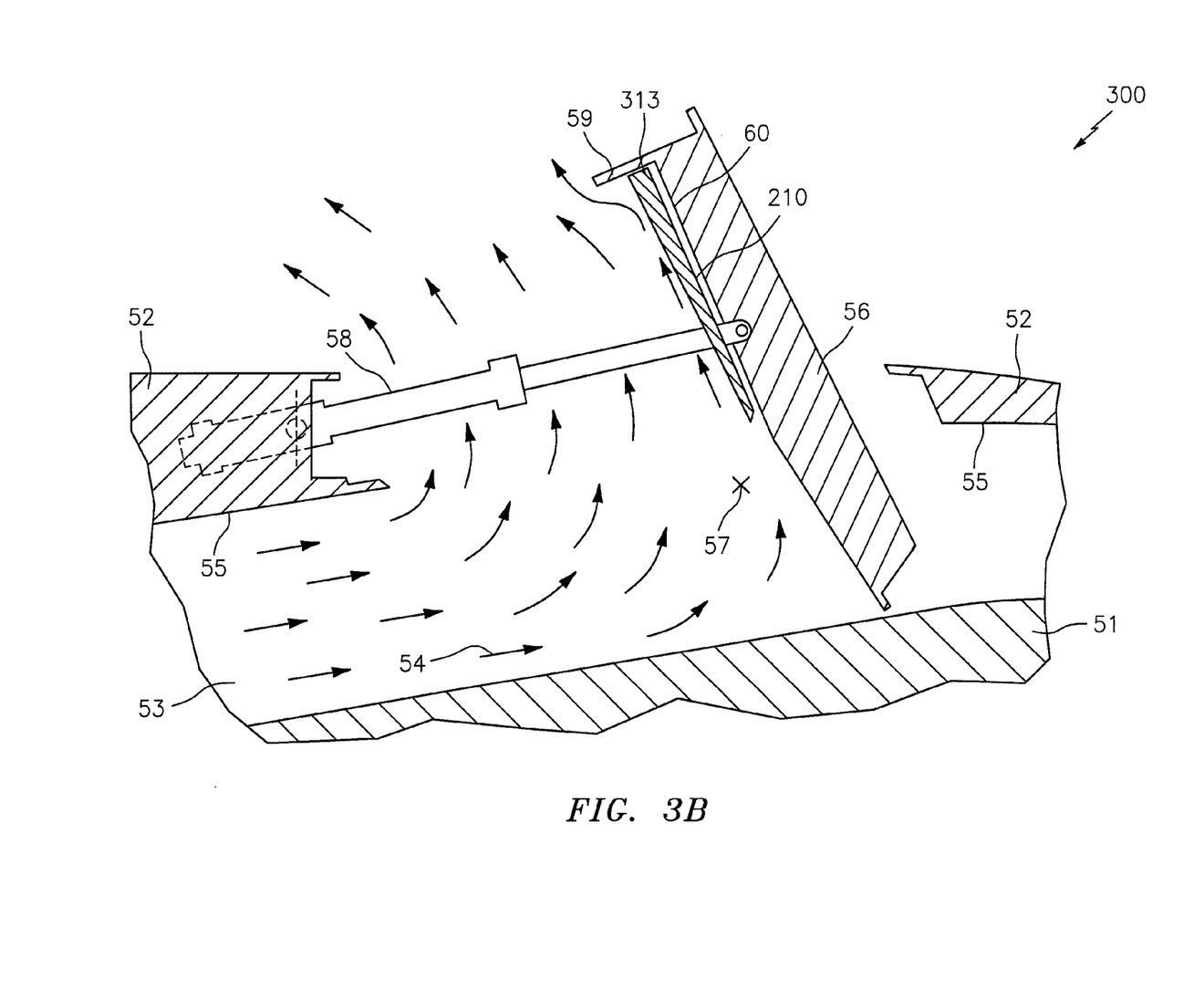
FIG. 3B illustrates the pivot-door-type thrust reverser of FIG. 3A when the thrust reverser is in a deployed state.

FIG. 3B illustrates the thrust reverser 300 operating in a deployed state. In FIG. 3B, the DE device 313 is shown in a second state (e.g., a de-energized state). The smaller size/profile of the DE device 313 in the second state (relative to the first state of the DE device 313 shown in FIG. 3A) may allow/enable air flow 54 to fill the cavity 62 (FIG. 3A) below the blocker door 56, thus allowing the blocker door 56 to open (based in part on actuation via the actuator 58).

Aspects of the disclosure may be applied in connection with a variable area nozzle. For example, aspects of the disclosure may be applied near the exit of a nacelle where a thrust reverser deploys. Embodiments that optimize the operational characteristics of modern high bypass ratio (BPR) turbofan engines may include varying the exit nozzle area around an engine core and the circumscribing nacelle.

Figure 4:
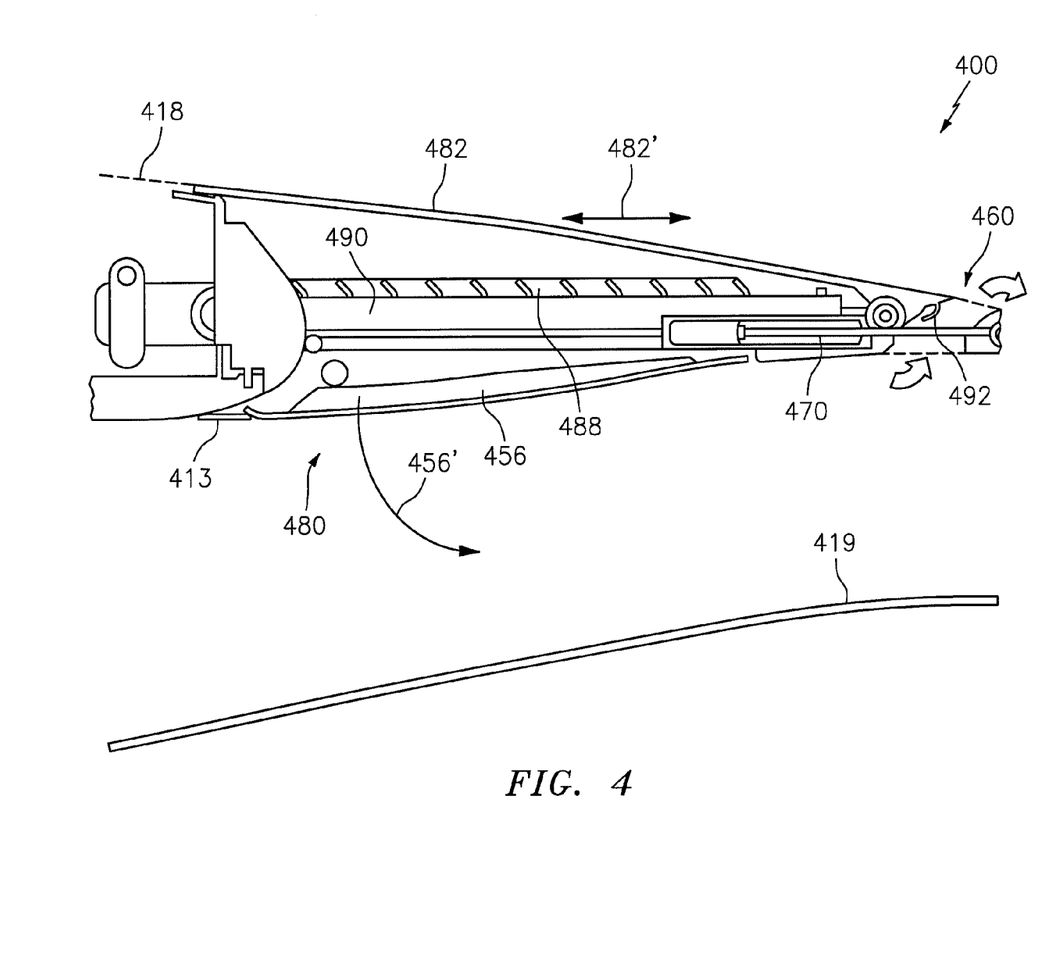
FIG. 4 illustrates a portion of an aircraft nacelle thrust reverser, including a nozzle assembly incorporating a DE device that provides for a sealing of a gap between edges of blocker doors of a cascade type thrust reverser.

FIG. 4 illustrates a variable area nozzle assembly 400. The assembly 400 includes a nacelle 418, an engine core cowl 419, an upstream exit 460, a ring actuator 470, a thrust reverser 480, a first sleeve section 482, cascade vanes 488, a sleeve actuator 490, and a pressure seal 492. The first sleeve section 482 may be axially translatable in the direction of the bidirectional arrow 482'.

The assembly 400 may include one or more blocker doors 456 (which may correspond to the blocker doors 56 described above). The blocker doors 456 may pivot in the direction of the arrow 456'.

The assembly 400 includes a DE device 413. The DE device 413 may seal a small gap between one or more edges of the blocker doors 456 when the blocker doors 456 are stowed.

Figure 5:
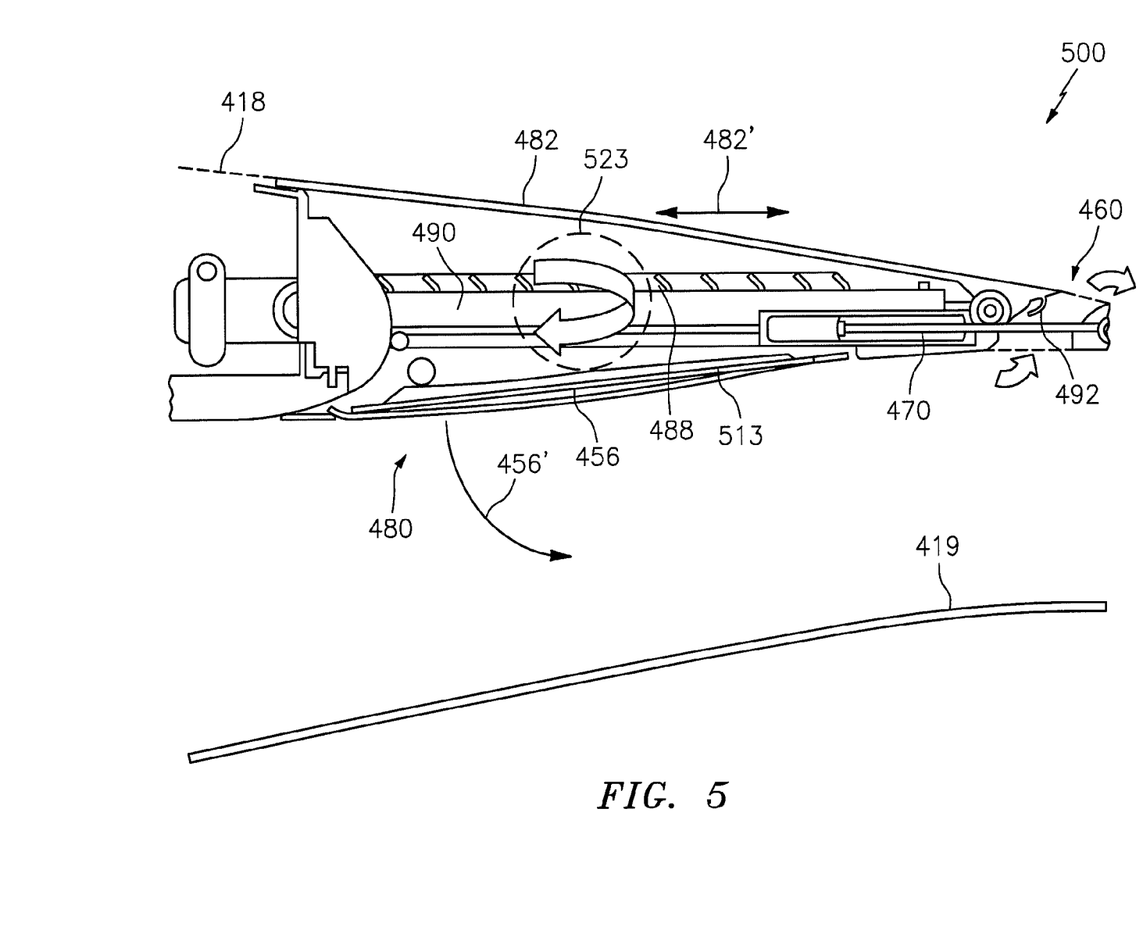
FIG. 5 illustrates a nozzle assembly incorporating a DE device that provides for a sealing of a side-length of blocker doors when a cascade type thrust reverser is operated in a stowed state.

FIG. 5 illustrates a variable area nozzle assembly 500. The (components/devices and operation of the) assembly 500 may be similar to the assembly 400 described above, and so, a complete re-description is omitted for the sake of brevity. Differences between the assembly 500, relative to the assembly 400, are described below.

In FIG. 5, a DE device 513 is used to seal a portion or an entire side-length of the blocker doors 456 in their stowed position resting on the inner surface of the nacelle 418. This eliminates/reduces any flow recirculation (shown via the circled arrow 523) behind the blocker doors 456 across the cascade vanes 488.

The shapes (e.g., triangular/wedge) and dimensions of the DE devices (e.g., DE devices 213, 313, 413, 513) described herein are illustrative. One skilled in the art would appreciate, based on a review of this disclosure, that other shapes/geometrical modes of the DE devices may be used.

Technical effects and benefits of this disclosure include, as a result of the use of DE devices, compact size/form factors, elimination or reduction of mechanical moving parts, accurate continuous control due to precise adjustment of surrounding fields (e.g., electric fields), a capability to fill a door pit cavity of conventional thrust reversers, an exposed kicker plate/blocker door during landing upon thrust reverser deployment, a reduction of total pressure loss, high levels of deformation (e.g., actuation) of the DE devices before returning to an "original" shape, and fast response times (e.g., during rapid aerodynamic transients), low power consumption from available power sources already on-board an aircraft (e.g., 28 Volts direct current (DC)). The use of DE devices provides for enhanced durability/reliability, particularly when confronted by sources of foreign object damage (FOD), such as for example rain, sleet, snow, ice, and hail. Aspects of the disclosure may be applied/retrofitted to an existing fleet of aircraft or incorporating into a newly-designed aircraft model.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

We claim:

1. A thrust reverser of an aircraft, comprising:
   a wall having a first surface that partially forms a flow channel associated with an air flow;
   a blocker door having a second surface that partially forms the flow channel;
   a dielectric elastomeric device that is configured to selectively expand and contract within a cavity formed between the wall and the blocker door where the cavity is substantially radially adjacent to the flow channel when the thrust reverser is in a stowed state; and
   a shutter plate extending between a first end and a second end, the shutter plate hinged to the blocker door at the first end;
   wherein the dielectric elastomeric device connects the blocker door to the shutter plate at the second end, and the dielectric elastomeric device is configured to pivot the shutter plate between a first position and a second position.

2. The thrust reverser of claim 1, wherein the dielectric elastomeric device is in a first state when the thruster reverser is operated in the stowed state and in a second state when the thrust reverser is operated in a deployed state.

3. The thrust reverser of claim 2, wherein a first size of the dielectric elastomeric device in the first state is larger than a second size of the dielectric elastomeric device in the second state.

4. The thrust reverser of claim 1, wherein the dielectric elastomeric device comprises an elastomer located between two electrodes.

5. The thrust reverser of claim 4, wherein the dielectric elastomeric device is in an energized state when the thruster reverser is operated in the stowed state and in a de-energized state when the thrust reverser is operated in a deployed state.

6. The thrust reverser of claim 5, wherein the energized state and the de-energized state are based on a voltage that is applied to the two electrodes.

7. The thrust reverser of claim 6, Wherein the voltage is based on a 28 Volt direct current aircraft power source.

8. The thrust reverser of claim 1, wherein the shutter plate partially forms the flow channel.

9. The thrust reverser of claim 8, wherein the first end of the shutter plate is hinged to the blocker door, and wherein the second end of the shutter plate couples to a protrusion formed in a deflector when the thrust reverser is operated in the stowed state.

10. The thrust reverser of claim 1, wherein the shutter plate is formed from at least one of aluminum, titanium, or a composite material.

11. The thrust reverser of claim 1, further comprising:
   an actuator configured to control a deployment or stowing of the blocker door.

12. The thrust reverser of claim 1, wherein the dielectric elastomeric device is wedge-shaped.

13. The thrust reverser of claim 1, wherein the dielectric elastomeric device is disposed outside of the flow channel when the thrust reverser is in the stowed state.

14. The thrust reverser of claim 1, wherein the first surface is upstream of the second surface.

* * * * *